(12) United States Patent
Ritter

(10) Patent No.: US 6,710,278 B2
(45) Date of Patent: Mar. 23, 2004

(54) DEVICE FOR THE WELDING OF A WIRE MESH GRID

(75) Inventor: Klaus Ritter, Graz (AT)

(73) Assignee: EVG Entwicklungs- & Verwertungs-Gesellschaft m.b.H., Raaba (AT)

( * ) Notice: Subject to any disclaimer, the term of this patent is extended or adjusted under 35 U.S.C. 154(b) by 0 days.

(21) Appl. No.: 10/031,974

(22) PCT Filed: Jun. 27, 2001

(86) PCT No.: PCT/AT01/00210
§ 371 (c)(1), (2), (4) Date: Jan. 24, 2002

(87) PCT Pub. No.: WO02/07922
PCT Pub. Date: Jan. 31, 2002

(65) Prior Publication Data
US 2002/0104828 A1 Aug. 8, 2002

(30) Foreign Application Priority Data
Jul. 24, 2000 (AT) .......... 1298/2000

(51) Int. Cl.⁷ .............. B23K 11/06
(52) U.S. Cl. .............. 219/56; 219/84
(58) Field of Search .............. 219/56, 58, 81, 219/83, 84

(56) References Cited
U.S. PATENT DOCUMENTS 2,001,688 A * 5/1935 Paugh .......... 219/120
2,799,768 A   7/1957 Allardt .......... 219/63
3,463,895 A * 8/1969 Senn .......... 219/56
4,439,658 A * 3/1984 Schmidt et al. .......... 219/56
5,077,458 A * 12/1991 Takano et al. .......... 219/116
5,446,254 A * 8/1995 Ritter et al. .......... 219/56

FOREIGN PATENT DOCUMENTS

| DE | 27 26 883 | * 12/1977 | .......... B23K/11/10 |
| GB | 2258837 | 2/1993 | .......... B23K/11/24 |
| WO | WO 90/15677 | 12/1990 | .......... B21K/27/10 |

* cited by examiner

Primary Examiner—M. Alexandra Elve
Assistant Examiner—Kevin P. Kerne
(74) Attorney, Agent, or Firm—Karl Hormann

(57) ABSTRACT

Apparatus for welding a wire mesh of crossing longitudinal and transverse wires, with a rotatable upper and lower electrode configured as a disk-like polygon, at least the upper electrode (2) being movable upwardly and downwardly and the upper and lower electrodes (2; 6) being rotatable to their working position in which a polygon surface extends parallel to the longitudinal wires, whereby the upper electrode and the lower electrode are provided at each polygon surface (8) with an internal distribution channel (13; 15) for cleaning air, preferably pressurized air, each distribution channel having at least one blow-out opening (14, 14'; 16, 16') terminating in the center on the polygonal surface (8) and a distributor (3, 3') for the cleaning air being associated with each of the upper electrode and the lower electrode, the distributors being each provided with a connector (11) for feeding cleaning air and with internally disposed air channels (12) connected to the connector and to the distribution channels of the upper and lower electrodes disposed in a working position.

10 Claims, 1 Drawing Sheet

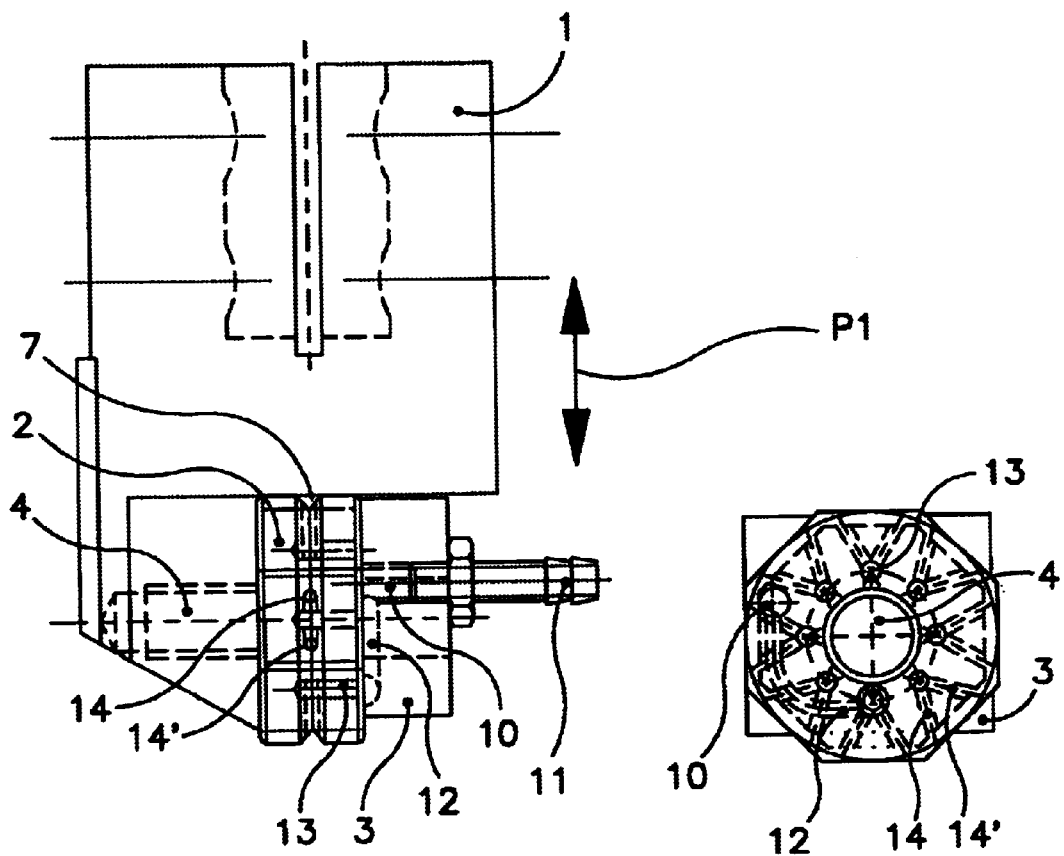
FIG. 2a
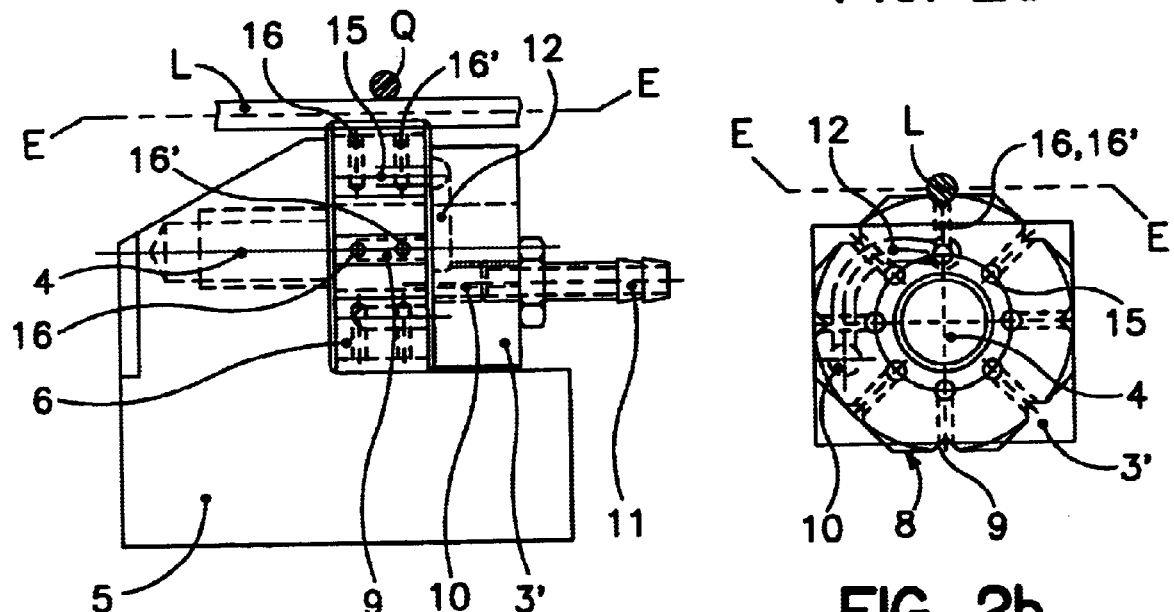
FIG. 2b
FIG. 1

DEVICE FOR THE WELDING OF A WIRE MESH GRID

BACKGROUND OF THE INVENTION

1. Field of the Invention

The invention relates to an apparatus for welding a wire mesh of longitudinal and transverse crossing wires with a rotatable upper and lower electrode configured as a disc-shaped polygon with at least the upper electrode being movable in upward and downward directions and the upper and lower electrode being rotatable into a working position in which each of the polygonal surfaces is disposed parallel to the longitudinal wires.

2. The Prior Art

From German patent specification 27 26 883, there is known a welding electrode for welding wire meshes which is structured in the manner of a circular ring or polygonal configuration similar thereto, such as an octahedron. The known apparatus suffers from the drawback that no precautions have been made to protect the contact surfaces of the welding electrodes from soiling. A further drawback is that the rounded surfaces of the wires to be welded together are disposed on a planar surface of the welding electrode so that there exists a linear contact only between the wire and the welding electrode.

OBJECT OF THE INVENTION

It is an object of the invention to overcome the mentioned disadvantages and to provide an apparatus of the kind referred to supra which makes it possible to provide welding electrodes for multiple applications and which ensures clean contacting of the wires with the welding electrode.

SUMMARY OF THE INVENTION

The apparatus in accordance with the invention is characterized by the upper electrode and the lower electrode being provided at each polygon surface with an internal distribution channel for cleaning air, preferably pressurized air, with each distribution channel being provided with a blow-out opening ending in the center of the polygon surface, and by each of the upper electrode and the lower electrode being associated with a manifold for the cleaning air, each manifold being provided with a connector for feeding of cleaning air and with an internal air channel connected to the connectors and the distribution channels of the of the upper and lower electrode in their working position.

In accordance with a further characteristic of the invention the upper electrode is provided at its circumference with a V-shaped transverse wire groove for receiving the transverse wire during welding, the lower electrode is provided at each polygon surface with a preferably V-shaped longitudinal wire groove disposed parallel to the plane of the longitudinal wire for receiving the longitudinal wire during welding, with each of the blow-out openings terminating in the center at the bottom of the transverse and longitudinal wire grooves.

Preferably, in the case of a plurality of blow-out openings in every polygon surface the blow-out openings are disposed symmetrically in the wire grooves or, if there are no wire grooves, they are also symmetrically disposed in that area of the polygon surface which is the welding position of the wires on the welding electrodes.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1 is a schematic side elevation of an embodiment of the apparatus in accordance with the invention;

FIG. 2a is a schematic side elevation of the upper electrode; and

FIG. 2b is a schematic side elevation of the lower electrode.

DETAILED DESCRIPTION OF THE PREFERRED EMBODIMENT.

The apparatus depicted in FIGS. 1, 2a and 2b is used for welding wire meshes of crossed longitudinal wires L and transverse wires with a plurality of longitudinal wires L being fed parallel and in unison, laterally spaced from each other, along the longitudinal wire plane E—E and the transverse wires Q are deposited in the welding position on the longitudinal wires L normal thereto. The surface of the wires L, Q may be smooth or ribbed, as is common in reinforcing bars. Furthermore, the surfaces of the wires may be clean or they may be provided with a rust flake or zing coating.

The apparatus is provided with an upper electrode support 1 which may be moved upwardly and downwardly in the directions of the double arrow P1. An upper electrode 2 and an air distributor 3 are affixed to the lower end of the upper electrode support 1 by a screw connection 4.

Furthermore, the apparatus is provided with a lower electrode support 5 arranged beneath the upper electrode support 1, preferably immovably. It is possible, however, in the context of the present invention to structure the lower electrode support 5 for upward and downward movement as well. At the lower end of the lower electrode support 5 there are affixed, by a screw connection 4, a lower electrode 6 and an air distributor 3' structurally identical to the air distributor 3.

The upper electrode 2 and the lower electrode 6 are of disk-like structure and are shaped as polygons, for instance as octahedrons. The upper electrode 2 is provided at its circumference with a circumferential wire groove 7 serving to receive the transverse wire Q during welding. It is of V-shaped cross-section and made to fit the dimensions of the transverse wire Q. The lower electrode 6, at each surface 8 of the polygon, is provided with a transverse wire groove 9 extending parallel to the plane E—E of the longitudinal wire L and serving to receive the longitudinal wire L during welding. In the context of the invention it is also possible, however, to utilize wire grooves 7 and wire grooves 9 of different configurations to suit the cross-sectional shape of the transverse and longitudinal wires.

Each of the air distributors 3, 3' is provided with an input channel 10 for feeding cleaning air, usually pressurized air, to the air distributors 3, 3' by way of an air connector 11. In the context of the invention, other technical gasses such as, for instance, nitrogen, may be used for cleaning.

An air channel 12 is connected to the input channel 10. For each of its polygon surfaces 8, the upper electrode 2 is provided with an upper distribution channel 13 which extends parallel to the longitudinal wire plane E—E, as well as with two blow-out openings 14, 14' extending in a V-shaped manner from the end of the distribution channel 13 to the bottom of the transverse wire groove 7. Each polygon surface 8 of the upper electrode 2 is provided with two such blow-out openings 14, 14'. The air channel 12 is structured such that only that distribution channel 13 is connected to the air channel 12, whose polygon surface 8 faces the longitudinal wire plane E—E. It is in this working or welding position only that the cleaning air reaches the blow-out openings from the connector 11 by way of the input channel 10, the air channel 12 and the upper distribution channel 13.

The air distributor 3' is identical to the air distributor 3. For each of its polygon surfaces 8 the lower electrode 6 is provided with a lower distribution channel 15 which extends parallel to the longitudinal wire plane E—E, and with two blow-out openings 16, 16' extending vertically from the distribution channel 15 to the bottom of the longitudinal wire groove 9. The air channel 12 in the air distributor 3' is structured such that only that one distribution channel 15 is connected to the air channel 12, whose polygon surface 8 faces the longitudinal wire plane E—E, i.e. which is in its working position. It is only in this working or welding position that cleaning air reaches the blow-out openings 16, 16' from the air connector 11 by way of the input channel 10, the air channel 12 and the upper distribution channel 15.

The apparatus in accordance with the invention operates in the following manner:

After feeding and depositing the transverse wire Q in its welding position the upper electrode holder 1 and the upper electrode are lowered sufficiently to place the transverse wire Q in the transverse wire groove 7. Shortly before lowering of the upper electrode 2 the cleaning air supply for the upper electrode 2 and for the lower electrode 6 is switched on, in consequence of which the transverse wire groove 7 and the longitudinal wire groove 9 are rinsed with cleaning air and any contaminations in the transverse wire groove 7 and in the longitudinal wire groove 9 are blown away. The air supply remains active during the ensuing welding operation as well as for some time following termination of the welding operation while the upper electrode 2 is being lifted. This follow-up blowing is particularly important in view of the fact that the contaminations, particularly those in the longitudinal wire groove 9 can only be effectively blown away when the upper electrode 2 is being lifted and the longitudinal wires are relieved and slightly lifted. To keep the controls as simple as possible, the upper and lower electrodes 2; 6 may be continually subject to cleaning air. The increased consumption of cleaning air when it is blowing continuously has to be weighed against the resultant savings in the controls.

As soon as the contact surface of the upper and lower electrodes 2; 6 and more particularly the transverse and longitudinal wire grooves 7; 9 are mechanically worn out as a result of repeated welding operations, or the contaminations are too substantial to be blown away or mechanically removed, the connections 4 of the corresponding 2 or 6 are released and the electrode is rotated until a new unused polygon surface 8 is disposed parallel to the longitudinal wire plane E—E, i.e. arrives in its working position. The connections 4 are tightened again, and the welding operation may continue. During this refurbishing phase, the cleaning air is switched off.

Depending on the surface characteristics of the wires, burnout, weld spatter, rust flake residue, drawing compound residue, zinc vapors, etc. may contaminate the surface of the welding electrodes. The apparatus in accordance with the invention offers the advantage of the surface and the transverse wire and longitudinal wire grooves of the upper and lower electrode are kept clean of such contaminations yielding welding connections of uniform quality by the avoidance such contaminations and increasing the useful life of the electrodes.

It will be understood, that in the context of the invention the described embodiment may be altered, especially in respect of the configuration and lay-out of the air channels in the air distributors. It is possible, in the context of the invention, to provide but one or more than two blow-out openings in the transverse wire and longitudinal wire grooves. Where a plurality of blow-out openings is provided, they will be distributed symmetrically over the wire grooves. Furthermore, it is possible, in the context of the invention, to provide the blow-out openings with slots extending parallel to the transverse wire and longitudinal wire grooves.

In the context of the invention it is also possible to use at least one welding electrode without wire grooves. This is advantageous where two adjacent wires are to be welded as so-called double wires. In that case the blow-out openings will terminate in the center of the polygon surfaces of the corresponding welding electrode. Several blow-out openings would also be distributed symmetrically and extend to the area occupied by the wires Q, L to welded in their welding position on the welding electrodes. The slots of slot-shaped blow-out openings will also extend parallel to the wires to be welded together.

What is claimed is:

1. An apparatus for welding a mesh from a first plurality of substantially parallel wires and a second plurality of substantially parallel wires extending normal to the first plurality, comprising:
    a rotatably mounted upper welding electrode of polygonal cross-section provided on its circumference with a plurality of welding surfaces adapted selectively to contact at least one wire of the first plurality thereof in substantially parallel relationship therewith;
    a rotatably mounted lower welding electrode of polygonal cross-section provided on its circumference with plurality of welding surfaces adapted selectively to contact at least one wire of the second plurality thereof in substantially parallel relationship therewith;
    manifold means in the upper and lower welding electrodes for forming at least one opening in each of the welding surfaces and individually connectable with a source of pressurized cleaning medium in response to a welding surface being in its parallel relationship with a wire for ejecting cleaning medium over the welding surface.

2. The apparatus of claim 1, wherein the upper is symmetrically positioned in each welding surface.

3. The apparatus of claim 2, wherein two openings are symmetrically positioned in each welding surface.

4. The apparatus of claim 1, wherein a groove disposed centrally of each welding surface extends around the circumference of one of the upper and lower electrodes and wherein the opening is symmetrically positioned in the groove.

5. The apparatus of claim 4, wherein two openings are symmetrically positioned within the groove.

6. The apparatus of claim 4, wherein a groove extending substantially axially of the other of the upper and lower welding electrodes is provided centrally of each welding surface and wherein the opening is symmetrically positioned in the groove.

7. The apparatus of claim 6, wherein two openings are symmetrically positioned within the groove.

8. The apparatus of claim 1, wherein the opening is of circular cross-section.

9. The apparatus of claim 1, wherein the opening is of elongated cross-section.

10. The apparatus of claim 1, wherein one of the upper and lower welding electrodes is vertically movable relative to the other welding electrode.

* * * * *